(12) United States Patent (10) Patent No.: US 8,775,382 B2
Choi et al. (45) Date of Patent: Jul. 8, 2014

(54) VIEW MAINTENANCE ON MULTIPLE TABLES LOCATED IN DIFFERENT SOFTWARE COMPONENTS WITH THE SAME PRIMARY KEYS

(75) Inventors: Richard F. Choi, San Francisco, CA (US); Xin Wang, Beijing (CN); Shouxin Wang, Beijing (CN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/659,265

(22) Filed: Mar. 2, 2010

(65) Prior Publication Data

US 2010/0169276 A1 Jul. 1, 2010

Related U.S. Application Data

(62) Division of application No. 11/068,056, filed on Feb. 28, 2005, now Pat. No. 7,685,184.

(51) Int. Cl.
*G06F 17/30* (2006.01)
(52) U.S. Cl.
CPC .............................. *G06F 17/30286* (2013.01)
USPC .......................................... 707/662; 707/634
(58) Field of Classification Search
CPC ............................................... G06F 17/30286
USPC ........................ 707/614, 615, 671, 634, 662
See application file for complete search history.

(56) References Cited

U.S. PATENT DOCUMENTS

| | | | |
|---|---|---|---|
| 7,024,430 B1 * | 4/2006 | Ingraham et al. | 1/1 |
| 2002/0194205 A1 * | 12/2002 | Brown et al. | 707/200 |
| 2004/0098546 A1 * | 5/2004 | Bashant et al. | 711/156 |
| 2005/0278302 A1 * | 12/2005 | Ritter | 707/3 |
| 2006/0200774 A1 | 9/2006 | Flam et al. | 715/764 |

OTHER PUBLICATIONS

Hsiao et al., "DLFM: a transactional resource manager," Proceedings of the 2000 ACM SIGMOD international conference on management of data, Feb. 2000, pp. 518-528. Retrieved from the Internet: <URL: http://portal.acm.org/ft_gateway.cfm?id=335461&type=pdf &coll=ACM&dl=ACM&CFID=64750779 &CFTOKEN=86212890>.
Muth et al., "The LHAM log-structured history data access method," The International Journal on Very Large Data Bases Archive vol. 8, Issue 3-4, Feb. 2000, pp. 199-221. Retrieved from the Internet: <URL: http://portal.acm.org/ft_gateway.cfm?id=764216 &type=pdf&coll=ACM&dl=ACM&CFID=64750779 &CFTOKEN=86212890>.

* cited by examiner

*Primary Examiner* — Shahid Alam
(74) *Attorney, Agent, or Firm* — Finnegan, Henderson, Farabow, Garrett & Dunner, LLP

(57) ABSTRACT

A method performed by a processor allows an individual to update or maintain a database including a core and an extension. The core contains core tables including general data and the extension contains extension tables including specific data. The core tables and the extension tables have the same primary keys and the specific data are an extension of the general data. The method includes receiving an input from the individual for modifying the database, modifying the core using the received input, and automatically modifying the extension to reflect the modifying of the core.

15 Claims, 4 Drawing Sheets

VIEW MAINTENANCE ON MULTIPLE TABLES LOCATED IN DIFFERENT SOFTWARE COMPONENTS WITH THE SAME PRIMARY KEYS

This is a divisional of application Ser. No. 11/068,056, filed Feb. 28, 2005, now U.S. Pat. No. 7,685,184 which is incorporated herein by reference.

TECHNICAL FIELD

The present invention relates to methods for maintaining a database and, more particularly, to methods for automatically updating an extension of the database while a core of the database is updated and for automatically updating the core of the database while the extension of the database is updated.

DESCRIPTION OF THE RELATED ART

As with many databases, a database for a benefit program is generally implemented in two parts: a core and an extension. The core includes tables for storing common data and the extension includes tables for storing specific data as an extension of the common data. For example, the core tables of a benefit program may store information such as an enrollee's name, gender, address, phone number, etc., because such information is common to everybody, while the extension tables may store information specifically related to the client who installs the database, such as information related to the personal identification system in the country where the client is located (a specific example is the Registered Permanent Residence (RPR) system in China), or additional information as required by the local accounting system. A client, such as an employer using the database to manage the benefit program provided to its employees, will typically install the core of the database, but may modify the extension, e.g., add new fields to the extension tables, to address the particularities of the client's situation. The design of such a two-part database allows for minimal adjustments to the core system for different clients because only the extension needs to be modified to address any particular requirements of the clients.

When the client employer modifies the database or when an employee enrolls in or modifies his benefit program by, e.g., adding or deleting a benefit plan, he may do so through so-called maintenance views, which are typically web interfaces. Through the maintenance view of the core, the employer or employee may access the database and request an addition or deletion of entries in the core tables. Through the maintenance view of the extension, the employer or employee may access and modify the extension tables. When the core is modified, the extension needs to be updated to reflect the changes made to the core tables, and vice versa. When the client employer needs to handle special needs, he may add new fields to the extension system. Such update of the core or extension while the other is being updated is currently being performed manually, and may cause inconsistencies between the core and the extension.

For one example, consider a core table that includes records of international benefit plans that are more common and an extension table that includes flexible benefit plans that are more specific. Both the core table and the extension table use the ending date of the benefit plans as the primary key. Thus, the core table may contain a record of an employee's benefit plan including an international benefit plan covering a period from Jan. 1, 2005, through Dec. 31, 9999 (year 9999 indicating that the plan will never expire), and the extension may contain information of the flexible benefit plan covering the same period. If the employer wants to maintain the short term benefit plans (for example, current-year benefit plans) separately from long term plans, the extension table will have two records corresponding to the record of the core table, i.e., a first record covering the short-term period of Jan. 1, 2005, through Dec. 31, 2005, and a second record covering the long-term period of Jan. 1, 2006, through Dec. 31, 9999. Then a problem arises when the extension table is manually updated to reflect an update made to the record in the core table. Particularly, because both the core table and the extension table use the ending date as the primary key, an update to the record ending on Dec. 31, 9999, would only enable the maintaining party to find the record in the extension table that also ends on Dec. 31, 9999, i.e., the second record. The first corresponding record in the extension table will not be found using this primary key and will not be updated.

SUMMARY

A method, consistent with the invention and performed by a processor, allows an individual to update or maintain a database including a core and an extension. The core contains core tables including general data and the extension contains extension tables including specific data. The core tables and the extension tables have the same primary keys and the specific data are an extension of the general data. The method includes receiving an input from the individual for modifying the database, modifying the core using the received input, and automatically modifying the extension to reflect the modifying of the core.

A computer-readable medium, consistent with the invention, contains a program for causing a processor to perform a method for an individual to update or maintain a database including a core and an extension. The core contains core tables including general data and the extension contains extension tables including specific data. The core tables and the extension tables have the same primary keys and the specific data are an extension of the general data. The method includes allowing the individual to maintain the core and allowing the individual to maintain the extension. When the individual maintains the core, the method further includes presenting to the individual a maintenance view of the core, receiving an input from the individual for modifying the database, modifying the core using the received input, and automatically modifying the extension to reflect the modifying of the core. When the individual maintains the extension, the method further includes synchronizing data between the core and the extension, and maintaining the extension.

A computer system, consistent with the invention, includes a processor and means for accessing a computer-readable medium containing a program for causing the processor to perform a method for an individual to update or maintain a benefit database including a core and an extension. The core contains core tables including general data and the extension contains extension tables including specific data. The core tables and the extension tables have the same primary keys and the specific data are an extension of the general data. The method includes allowing the individual to maintain the core and allowing the individual to maintain the extension. When the individual maintains the core, the method further includes presenting to the individual a maintenance view of the core, receiving an input from the individual for modifying the database, modifying the core using the received input, and automatically modifying the extension to reflect the modifying of the core. When the individual maintains the extension, the method further includes synchronizing data between the core and the extension, and maintaining the extension.

Additional features and advantages of the invention appear in the following description and will be obvious from the description, or may be learned by practicing the invention. The foregoing background and summary are not intended to be comprehensive, but instead serve to help one skilled in the art understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION OF THE EMBODIMENTS

The following description refers to the accompanying drawings, in which, in the absence of a contrary representation, the same numbers in different drawings represent similar elements. The following implementations do not represent all implementations consistent with the claimed invention. Instead, they are merely examples. Other implementations, and modifications of the described implementations, may also fall within the scope of present invention.

A database for a benefit program generally includes a core, which includes core tables for storing data common to every enrollee. For example, entries of the core tables may include information such as an enrollee's name, gender, address, phone number, etc. The database also includes extensions, which include extension tables designed to store information specific to different applications. The extension tables and the core tables have the same primary keys. For example, if the database is being used by an employer in China to provide the benefit program to its employees, entries of the extension tables may include information such as the enrollee's PRP, and both the core tables and the extension tables use the enrollee's name and/or telephone number as the primary keys. Thus, to use the database, a client will install the core and choose a particular extension suitable for his application or locality.

Figure 1:
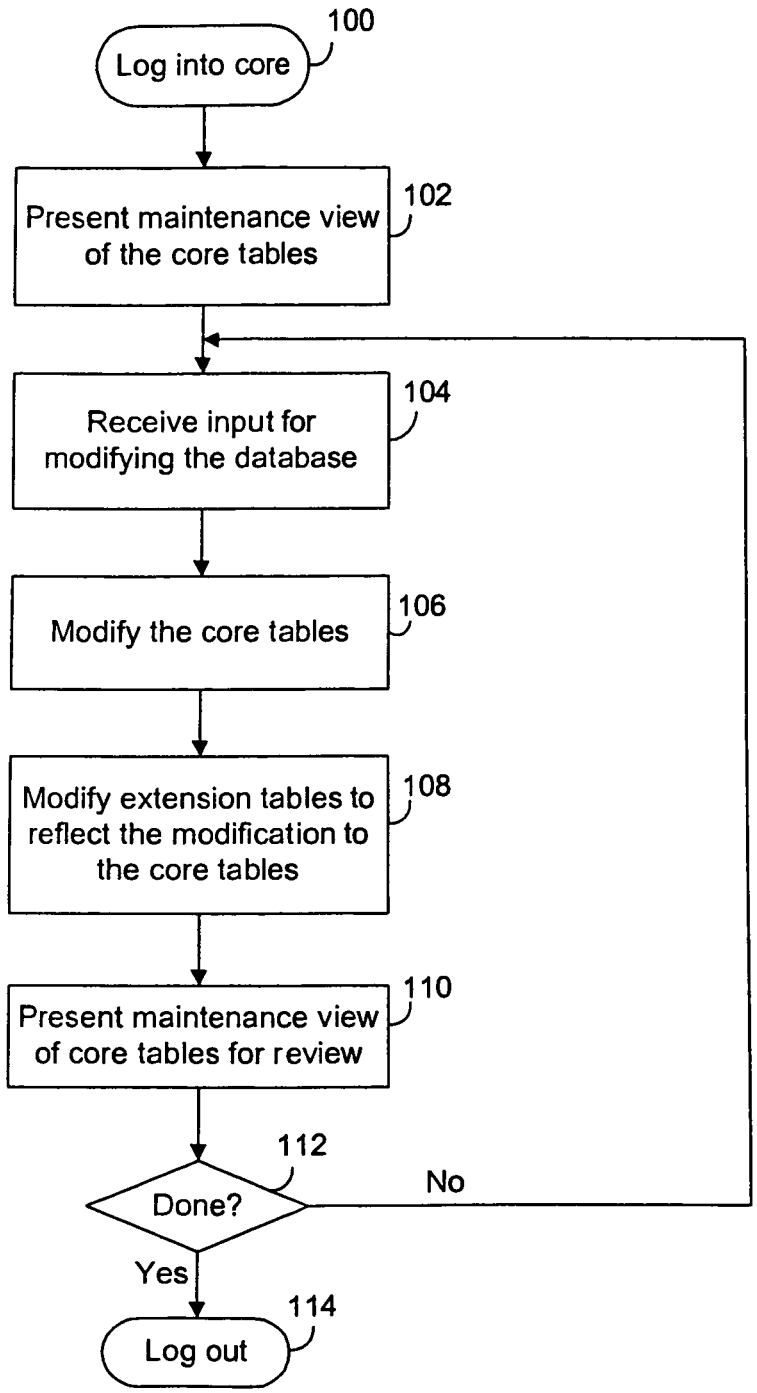
FIG. 1 is a flow chart showing steps of the method consistent with embodiments of the present invention for maintaining a database when an individual maintains a core of the database.
Figure 2:
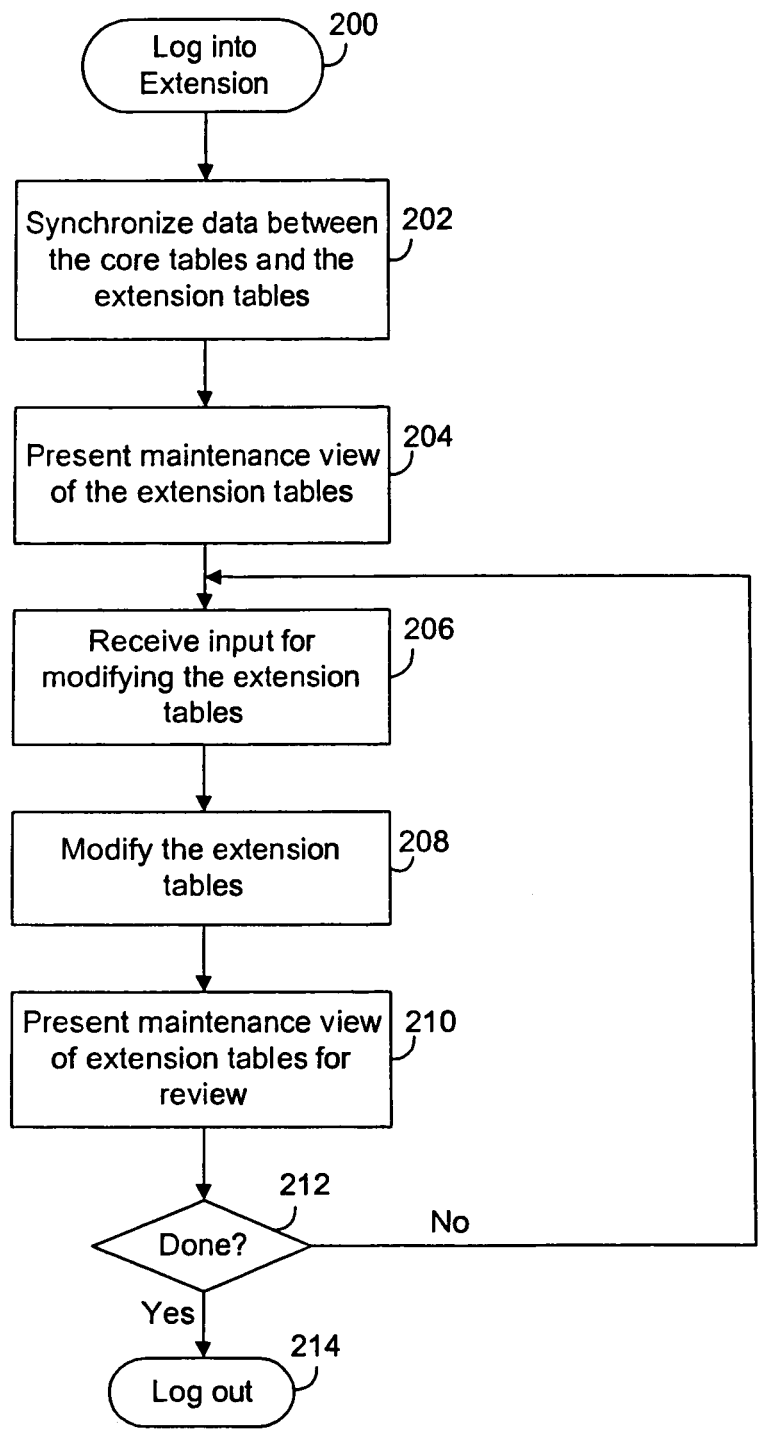
FIG. 2 is a flow chart showing steps of the method consistent with embodiments of the present invention for maintaining a database when an individual maintains an extension of the database.

Consistent with the present invention, a method for maintaining the database automatically maintains data consistency between the core and extension. FIGS. 1 and 2 show two aspects of the method of the present invention.

The flow chart in FIG. 1 shows that the method consistent with the present invention automatically maintains data consistency between the core and extension when an individual modifies the core.

First, the individual logs into the core (Step 100) and is presented with the maintenance view of the core tables (Step 102). The maintenance view of the core tables may be presented through a web interface that allows input from the individual. A first input from the individual information is received for modifying the database. (Step 104). The core tables are modified based on the first input. (Step 106). The extension tables are also automatically modified consistent with the modification to the core tables. (Step 108). The maintenance view of the updated core tables is then presented to the individual for review. (Step 110). At Step 112, a second input from the individual is received indicating whether the maintenance is finished. If so, the individual is logged out of the database. (Step 114). Otherwise, additional input from the individual is received for updating or maintaining the database and Steps 104-112 are repeated.

The modification to the core tables at Step 102 may be the addition of a new entry, the deletion or delimitation of an existing entry. Then, at Step 104, the extension tables are modified accordingly. Particularly, if a new entry has been added to the core tables, a corresponding new entry with the same primary keys is added to the extension tables. If an entry in the core tables has been deleted or delimited, the corresponding entry in the extension tables is also deleted or delimited. For example, consider the situation in the above example where the core table contains a record of an employee's benefit plan over a period from Jan. 1, 2005, through Dec. 31, 9999, and the extension contains a record covering that same period. If there is a change of plan for the period from Jan. 1, 2005, through Dec. 31, 2005, the entry of the core table covering the period from Jan. 1, 2005, through Dec. 31, 9999, is split into two entries at Step 106: a first entry covering the period from Jan. 1, 2005, through Dec. 31, 2005, and a second entry covering the period of Jan. 1, 2006, through Dec. 31, 9999. To maintain the consistency of data between the extension tables and the core tables, the corresponding entry in the extension table is automatically delimited at Step 108 into two entries, i.e., a first entry covering the period from Jan. 1, 2005, through Dec. 31, 2005, and a second entry covering the period of Jan. 1, 2006, through Dec. 31, 9999.

The flow chart in FIG. 2 shows that the method consistent with the present invention automatically maintains data consistency between the core and extension when an individual modifies the extension.

First, the individual logs into the extension. (Step 200). The data in the extension tables are synchronized with the data in the core tables. (Step 202.) Then the individual is presented with a maintenance view of the extension tables. (Step 204). The maintenance view of the extension tables may be presented through a web interface that allows input from the individual. A first input from the individual information is received for modifying the database. (Step 206). The extension tables are modified based on the first input. (Step 208). The maintenance view of the updated extension tables is then presented to the individual for review. (Step 210). At Step 212, a second input from the individual is received indicating whether the update or maintenance is finished. If so, the individual is logged out of the database. (Step 214). Otherwise, additional input from the individual is received for updating or maintaining the database and Steps 206-212 are repeated.

During the synchronization at Step 202, the data in the extension tables are compared with the data in the core tables and any inconsistency is resolved. Particularly, when an entry in the core table does not correspond to any entry in the extension table, a new entry is added into the extension table with the same keys as the entry in the core table. If an entry in the extension table does not find a counterpart in the core table, that entry in the extension table is deleted.

As discussed above, the method consistent with the present invention automatically maintains the data consistency between the core and the extension whether the individual maintains the core or the extension. If the individual maintains the core, the steps shown in FIG. 1 are performed. If the individual maintains the extension, the steps shown in FIG. 2 are performed. Thus, possible data inconsistencies between the core and extension tables caused by manual update of the database are avoided.

A computer system may be used to install the database and a software application implementing the method for maintaining the database consistent with embodiments of the present invention. The computer system may be a computer network, as shown in FIG. 3, or a stand-alone personal computer (PC), as shown in FIG. 4.

Figure 3:
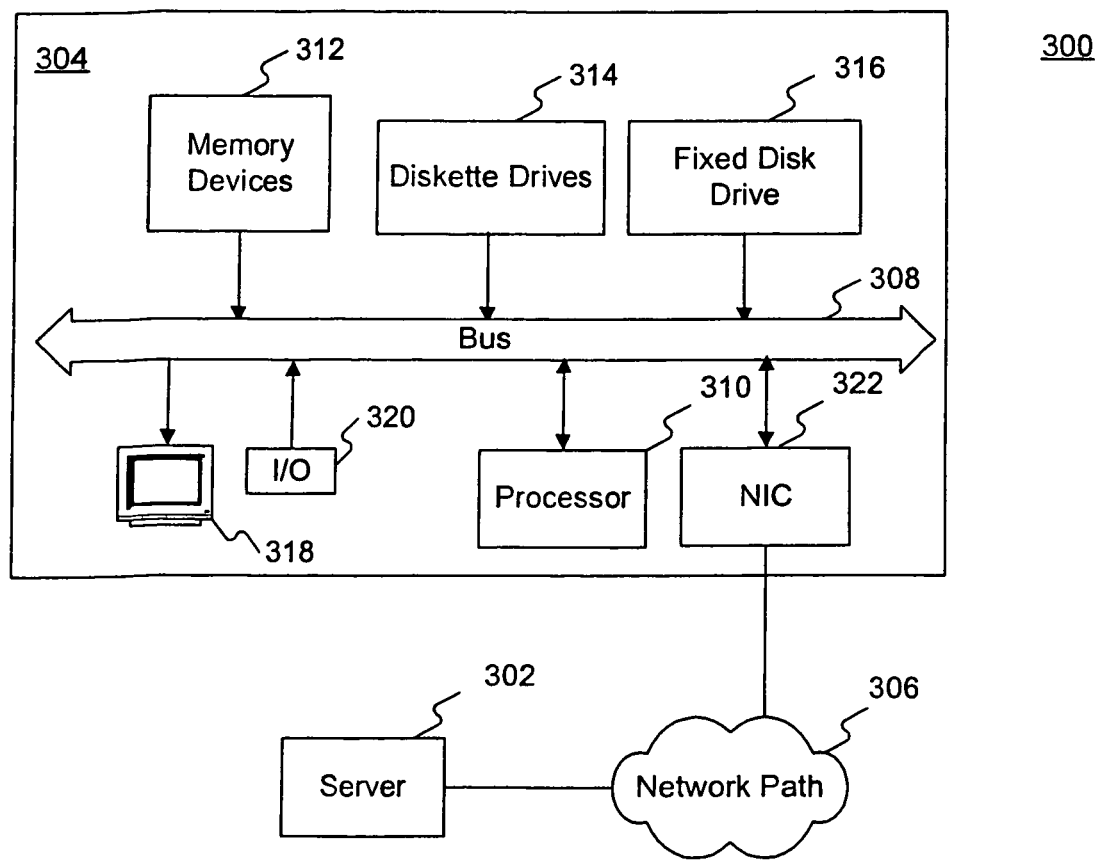
FIG. 3 shows a computer system for implementing the method consistent with the present invention.
Figure 4:
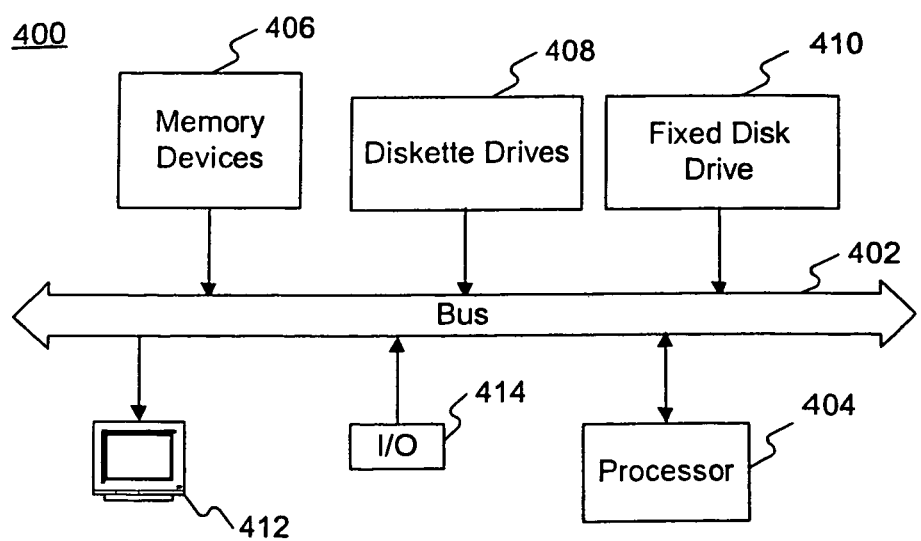
FIG. 4 shows another computer system for implementing the method consistent with the present invention.

In FIG. 3, a computer network 300 for storing the database and the software application includes a server 302 and a stand-alone PC 304 connected through a network path 306. Computer network 300 may be a local area network (LAN), where server 302 and PC 304 are workstations. Computer network 300 may also be the Internet, with server 302 on the side of the client installing the database and PC 304 being any workstation available to an individual maintaining the database. Alternatively, computer network 300 is a wide area network (WAN), and server 302 and PC 304 lie in two separate LANs connected through the Internet.

PC 304 includes a bus line 308 connecting a plurality of devices such as a processor 310, memory devices 312 for storage of information, diskette drives 314, a fixed disk drive 316, a monitor 318, other I/O devices 320, and a network interface card (NIC) 322. Processor 310 may be a microprocessor such as an Intel Pentium chip for processing applications. Memory devices 312 may include read-only memories (ROM) and/or random access memories (RAM). Diskette drives 314 may include a floppy drive and/or a compact disk (CD) drive. Fixed disk drive 316 may be a hard drive. Monitor 318 displays the output from processor 310, and may also echo the input of the user. I/O devices 320 may include a keyboard and/or a mouse for receiving input from a user of PC 304. PC 304 is connected to network path 306 through NIC 322.

The database for the benefit program is installed in server 302. An individual maintaining the database accesses and communicates with PC 304, which further communicates with server 302 through NIC 322 and network path 306. In one aspect, the software application implementing the method consistent with the present invention is stored in PC 304 and processor 310 of PC 304 executes the software application locally within PC 304. Particularly, the software application may be stored on a floppy disk or a CD accessible by diskette drive 314 or on fixed disk drive 316. In another aspect, the software application implementing the method consistent with the present invention is stored in server 302, which executes the software application, and processor 310 of PC 304 communicates with server 302 to send information to server 302 and retrieve the results of the execution of the software application from server 302.

Through the execution of the software application, either locally within PC 304 or remotely within server 302, the database stored in server 302 may be maintained.

Alternatively, a stand-alone PC 400 shown in FIG. 4 may be used for implementing the database modification method consistent with the present invention. PC 400 includes a bus line 402 connecting a plurality of devices such as a processor 404, memory devices 406 for storage of information, diskette drives 408, a fixed disk drive 410, a monitor 412, and other I/O devices 414. Processor 404 may be a microprocessor such as an Intel Pentium chip for processing applications. Memory devices 406 may include ROM and/or RAM. Diskette drives 408 may include a floppy drive and/or a compact disk (CD) drive. Fixed disk drive 410 may be a hard drive. Monitor 412 displays the output of processor 404 and may also echo the input of the user. I/O devices 414 may include a keyboard and/or a mouse for receiving input from a user of PC 400.

The database and the software application implementing the method consistent with the present invention may be stored together or separately on a floppy disk or a CD accessible by diskette drive 408 or on fixed disk drive 410. Processor 404 executes the software application stored in the floppy disk, the CD, or the fixed disk drive 410. An individual, through monitor 412 and I/O devices 414, interacts with processor 404, which executes the software application, thereby accessing and modifying the database.

The foregoing description of possible implementations consistent with the present invention does not represent a comprehensive list of all such implementations or all variations of the implementations described. The description of only some implementations should not be construed as an intent to exclude other implementations. One skilled in the art will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A method performed by a processor for an individual to maintain a database including a core and an extension, wherein the core contains core tables including general data and the extension contains extension tables including specific data, the method comprising:
    comparing general data from at least one core table with specific data from at least one extension table, wherein the at least one core table and the at least one extension table have the same primary keys and the specific data extends from the general data;
    receiving an input from the individual for modifying the database;
    modifying the core using the received input;
    modifying the extension to reflect the modifying of the core;
    automatically adding a new entry to the at least one extension table when a first entry in the at least one core table does not correspond to any entry in the at least one extension table; and
    automatically deleting all entries from the at least one extension table that are identified, based on the comparison, as not corresponding to any entry in the at least one core table.

2. The method of claim 1, further comprising maintaining the extension.

3. The method of claim 2, wherein maintaining the extension comprises:
    presenting to the individual a maintenance view of the extension;
    receiving a first input from the individual for modifying the extension; and
    modifying the extension using the first input.

4. The method of claim 3, wherein maintaining the extension further comprises:
    presenting to the individual a maintenance view of the modified extension;
    receiving a second input for determining whether the maintaining of the extension should be terminated; and repeating the receiving of the first input and the modifying of the extension when the second input indicates that the maintenance of the extension should not be terminated.

5. The method of claim 4, wherein:
presenting to the individual the maintenance view of the modified extension comprises presenting to the individual the maintenance view of the modified extension through a web interface;
receiving the first input from the individual for modifying the extension comprises receiving the first input through the web interface; and
receiving the second input from the individual for determining whether the maintaining of the extension should be terminated comprises receiving the second input through the web interface.

6. A system comprising:
a database comprising:
a core containing core tables, wherein the core tables include general data and primary keys; and
an extension containing extension tables, wherein the extension tables include specific data and share the same primary keys as the core tables, and further wherein the specific data extends from the general data; and a processor configured to perform steps comprising:
comparing general data from at least one core table with specific data from at least one extension table;
receiving an input for modifying the database;
modifying the core using the received input;
modifying the extension to reflect the modifying of the core;
automatically adding a new entry to the at least one extension table when a first entry in the at least one core table does not correspond to any entry in the at least one extension table; and
automatically deleting all entries from the at least one extension table that are identified, based on the comparison, as not corresponding to any entry in the at least one core table.

7. The system of claim 6, wherein the processor is further configured to perform the step of maintaining the extension.

8. The system of claim 7, wherein the step of maintaining the extension comprises the steps of:
presenting a maintenance view of the extension;
receiving a first input for modifying the extension; and
modifying the extension using the first input.

9. The system of claim 8, wherein the step of maintaining the extension further comprises the steps of:
presenting a maintenance view of the modified extension;
receiving a second input for determining whether the maintaining of the extension should be terminated; and
repeating the receiving of the first input and the modifying of the extension when the second input indicates that the maintenance of the extension should not be terminated.

10. The system of claim 9, wherein:
the step of presenting the maintenance view of the modified extension comprises presenting the maintenance view of the modified extension through a web interface;
the step of receiving the first input for modifying the extension comprises receiving the first input through the web interface; and
the step of receiving the second input for determining whether the maintaining of the extension should be terminated comprises receiving the second input through the web interface.

11. A computer-readable non-transitory storage medium containing instructions, which, when executed, cause a processor to perform a method for an individual to maintain a database including a core and an extension, wherein the core contains core tables including general data and the extension contains extension tables including specific data, the method comprising:
comparing general data from at least one core table with specific data from at least one extension table, wherein the at least one core table and the at least one extension table have the same primary keys and the specific data extends from the general data;
receiving an input from the individual for modifying the database;
modifying the core using the received input;
modifying the extension to reflect the modifying of the core;
automatically adding a new entry to the at least one extension table when a first entry in the at least one core table does not correspond to any entry in the at least one extension table; and
automatically deleting all entries from the at least one extension table that are identified, based on the comparison, as not corresponding to any entry in the at least one core table.

12. The computer-readable storage medium of claim 11, further comprising instructions, which, when executed, cause the processor to maintain the extension.

13. The computer-readable storage medium of claim 11, further comprising instructions, which, when executed, cause the processor to:
present to the individual a maintenance view of the extension;
receive a first input from the individual for modifying the extension; and
modify the extension using the first input.

14. The computer-readable storage medium of claim 13, further comprising instructions, which, when executed, cause the processor to:
present to the individual a maintenance view of the modified extension;
receive a second input for determining whether the maintaining of the extension should be terminated; and
repeat the receiving of the first input and the modifying of the extension when the second input indicates that the maintenance of the extension should not be terminated.

15. The computer-readable storage medium of claim 14, further comprising instructions, which, when executed, cause the processor to:
present to the individual the maintenance view of the modified extension through a web interface;
receive the first input through the web interface; and
receive the second input through the web interface.

* * * * *